(12) United States Patent
Jo et al.

(10) Patent No.: US 8,542,564 B2
(45) Date of Patent: Sep. 24, 2013

(54) METHOD FOR DESIGNATING DISK RECORDING CAPACITY AND APPARATUS THEREFOR

(75) Inventors: Sang-hyun Jo, Seoul (KR); Seung-chul Kim, Anyang-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 2878 days.

(21) Appl. No.: 10/942,770

(22) Filed: Sep. 17, 2004

(65) Prior Publication Data
US 2005/0207300 A1    Sep. 22, 2005

(30) Foreign Application Priority Data
Mar. 16, 2004  (KR) .................. 10-2004-0017674

(51) Int. Cl.
*G11B 5/09*  (2006.01)
(52) U.S. Cl.
USPC ............ 369/53.12; 369/47.38; 369/53.14
(58) Field of Classification Search
USPC ............................ 369/53.12, 53.14, 47.38
See application file for complete search history.

(56) References Cited

U.S. PATENT DOCUMENTS

| | | | | |
|---|---|---|---|---|
| 5,862,113 A | * | 1/1999 | Tsuyuguchi et al. | 369/53.18 |
| 5,963,517 A | * | 10/1999 | Nakagaki et al. | 369/53.14 |
| 7,257,062 B2 | * | 8/2007 | Li et al. | 369/47.44 |
| 7,313,058 B2 | * | 12/2007 | Arakawa | 369/44.32 |
| 2002/0003941 A1 | * | 1/2002 | Hatae et al. | 386/46 |
| 2004/0013066 A1 | * | 1/2004 | Oono et al. | 369/53.14 |
| 2006/0028945 A1 | * | 2/2006 | Huang et al. | 369/53.13 |

FOREIGN PATENT DOCUMENTS

| | | |
|---|---|---|
| JP | 11-167773 | 6/1999 |
| JP | 2002-84496 | 3/2002 |
| KR | 010038786 | 5/2001 |
| KR | 010076705 | 8/2001 |

OTHER PUBLICATIONS

Machine Translation of JP publication No. 11167773 by Yamamoto in Jun. 22, 1999.*

Japan translation for JP 11-167773 A document from AIPN system by Yamamoto Kazuo on Dec. 4, 1997.*

* cited by examiner

*Primary Examiner* — Joseph Feild
*Assistant Examiner* — Linh N Hoffner
(74) *Attorney, Agent, or Firm* — Staas & Halsey LLP

(57) ABSTRACT

A method of designating a disk recording capacity and an optical disk recording apparatus using the method, where a maximum recording capacity is designated by measuring an external disturbance for disk regions. The method of designating a disk recording capacity includes: partitioning a disk into a plurality of disk regions, and measuring external disturbance at the disk regions; setting a disk speed based on the measured external disturbance, and designating disk regions excluding the disk regions where the external disturbance is measured as recordable disk regions; and calculating a maximum disk recording capacity based on the designated recordable disk regions.

5 Claims, 2 Drawing Sheets

METHOD FOR DESIGNATING DISK RECORDING CAPACITY AND APPARATUS THEREFOR

CROSS-REFERENCE TO RELATED APPLICATIONS

This application claims the priority of Korean Patent Application No. 2004-17674, filed on Mar. 16, 2004 in the Korean Intellectual Property Office, the disclosure of which is incorporated herein in its entirety by reference.

BACKGROUND OF THE INVENTION

1. Field of the Invention

The present invention relates to an optical disk recording method and apparatus, and more particularly, to a method of designating disk recording capacity capable of designating a maximum disk recording capacity by measuring external disturbance at disk regions and an optical disk recording apparatus using the method.

2. Description of the Related Art

An optical disk recording/reproducing apparatus reproduces or records data from or to an optical disk such as a compact disk (CD), a compact disc read only memory (CD-ROM) disk, a digital video disk (DVD), a compact disk readable (CD-R) disk, compact disk rewritable (CD-RW) disk, a DVD±RW disk, and a DVD±R disk. The optical disk recording/reproducing apparatus comprises an optical disk driving unit having various servo control systems including a mechanical driving control system for accurately picking up an RF signal from the optical disk.

At the time of recording data on the recordable disk such as CD-R, CD-RW, DVD±R, and DVD±RW disks, the optical disk recording/reproducing apparatus informs a host of an outmost circumference address of the optical disk obtained by reading information such as an "absolute time in pre-groove" (ATIP) and an "address in pre-groove" recorded in a table_of_contents (TOC) region on the optical disk. The host displays a maximum recording capacity based on the outmost circumference address of the disk received from the optical disk recording/reproducing apparatus. The user is aware of the maximum recording capacity displayed on the window of the host. Therefore, the optical disk recording/reproducing apparatus records data on the disk up to the outmost circumference address. If an external disturbance such as eccentricity, and eccentric center occurs at a particular region of the disk, the data may not be recorded. In this case, the optical disk recording/reproducing apparatus decreases the disk speed in order to stabilize the servo. However, there is a case that data cannot be recorded even though the disk speed decreases. For example, data cannot be recorded when there is external disturbance such as tilt that is not related to the disk speed. As a result, data is not recorded on a particular disk region, so that data cannot be recorded up to the maximum recording capacity. In some cases, the disk itself must be discarded.

SUMMARY OF THE INVENTION

In accordance with an aspect of the present invention, a method of designating disk recording capacity capable of designating a maximum disk recording capacity by measuring external disturbance at disk regions and an optical disk recording apparatus using the method are provided.

According to an aspect of the present invention, there is provided a disk recording method including: partitioning a disk into a plurality of disk regions, and measuring external disturbance at the disk regions; setting a disk speed based on the measured external disturbance, and designating disk regions excluding the disk regions where the external disturbance is measured as recordable disk regions; and calculating a maximum disk recording capacity based on the designated recordable disk regions.

According to another aspect of the present invention, there is provided an optical pick-up unit, which records a signal on a disk in response to an optical driving signal and detects a read-in signal on a recording region as a high frequency signal; a reproducing control unit which measures an external disturbance at disk regions and designates recordable disk regions based on the external disturbance; a microprocessor which generates a servo control signal used to set a disk speed in accordance with the external disturbance received from the reproducing control unit; and a driving unit which generates a driving control signal used to adjust a speed of a spindle motor in accordance with the servo control signal received form the microprocessor.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
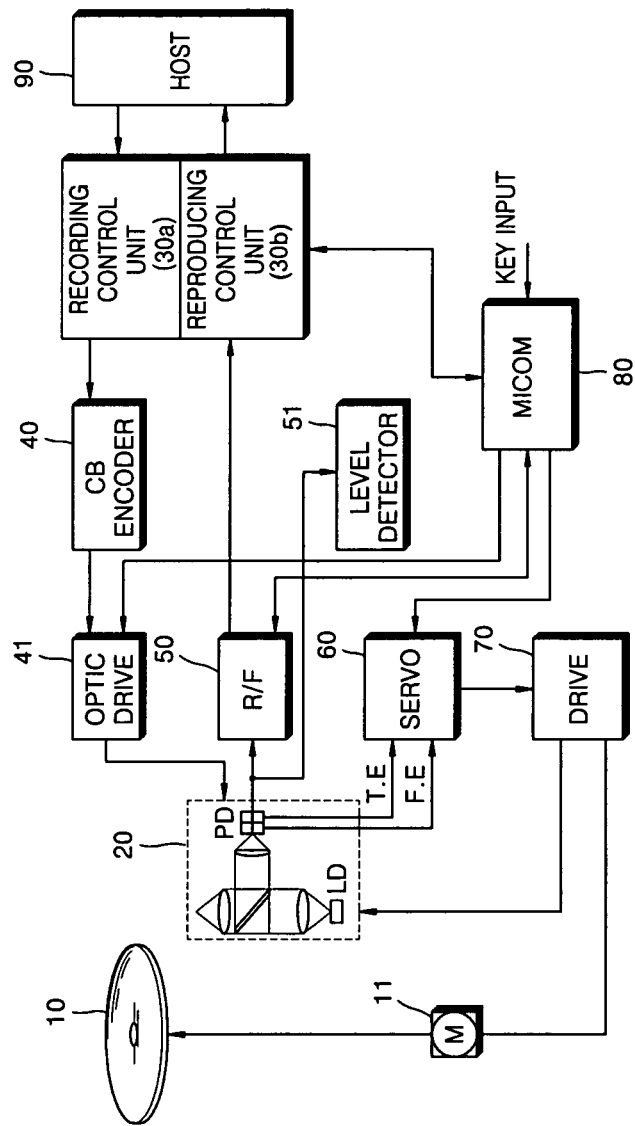
FIG. 1 is a block diagram showing an optical disk recording/reproducing apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram showing an optical disk recording/reproducing apparatus according to an embodiment of the present invention.

The optical disk recording/reproducing apparatus comprises an optical pick-up unit 20, a recording control unit 30a, a reproducing control unit 30b, a channel bit encoder 40, an optical driving unit 41, an RF processing unit 50, a level detector 51, a servo control unit 60, a driving unit 70, a microprocessor 80, and a host 90.

The recording control unit 30a converts digital data received from the host 90 into recording-format data by adding an error correction code (ECC) to the digital data.

The channel bit encoder 40 converts the recording-format data into bit-stream data. The optical driving unit 41 outputs an optical driving signal in response to an input signal. The optical pick-up unit 20 records a signal on an optical disk 10 in response to the optical driving signal. The optical pick-up unit 20 detects the recorded signal from a recording region of the optical disk 10 as an RF (Radio Frequency) signal.

The RF processing unit 50 converts the RF signal detected by the optical pick-up unit 20 into a binary signal. The level detector 51 detects a level of the RF signal reflected on the recording regions. The driving unit 70 drives a sled motor (not shown) moving the optical pick-up unit 20 and a spindle motor 11 rotating the optical disk 10 in response to a drive control signal generated by the servo control unit 60.

The servo control unit 60 controls the driving unit 70 for both reading and writing operations, in response to a tracking error (TE) signal and a focusing error (FE) signal generated by the optical pick-up unit 20 and a servo control signal generated by the microprocessor 80.

The reproducing control unit 30b restores an original signal from the binary signal converted by the RF processing unit 50 in accordance with a phase synchronization signal. The reproducing control unit 30b measures tilts and eccentricity centers for the disk regions with reference to the level detected by the level detector 51. The reproducing control unit 30b determines whether or not there is an external disturbance by comparing the tilts or the eccentric centers with respective reference values, and transmits information on the external disturbance to the microprocessor 80. In addition, the reproducing control unit 30b determines disk type and disk recording history by analyzing the binary signal converted by the RF processing unit 50. Next, the reproducing control unit 30b designates the recordable disk regions based on the measured external disturbance and transmits information on the recordable disk regions to the host 90, which determines a maximum recording capacity of the optical disk.

The microprocessor 80 fixes the speed at which the optical disk is driven by the recording/reproducing apparatus in accordance with the information on the external disturbance transmitted by the reproducing control unit 30b and transmits a servo control signal to the servo control unit 60. The microprocessor 80 transmits control signals to the servo control unit 60, the RF processing unit, the optical driving unit 41, the recording control unit 30, and the reproducing control unit 30b in response to a key input from a user.

The host 90 calculates a maximum recording capacity based on information on the recordable disk regions transmitted by the reproducing control unit 30b and displays the maximum recording capacity on an on-screen-display (not shown). The host 90 transmits to-be-recorded data to the recording control unit 30a.

Figure 2:
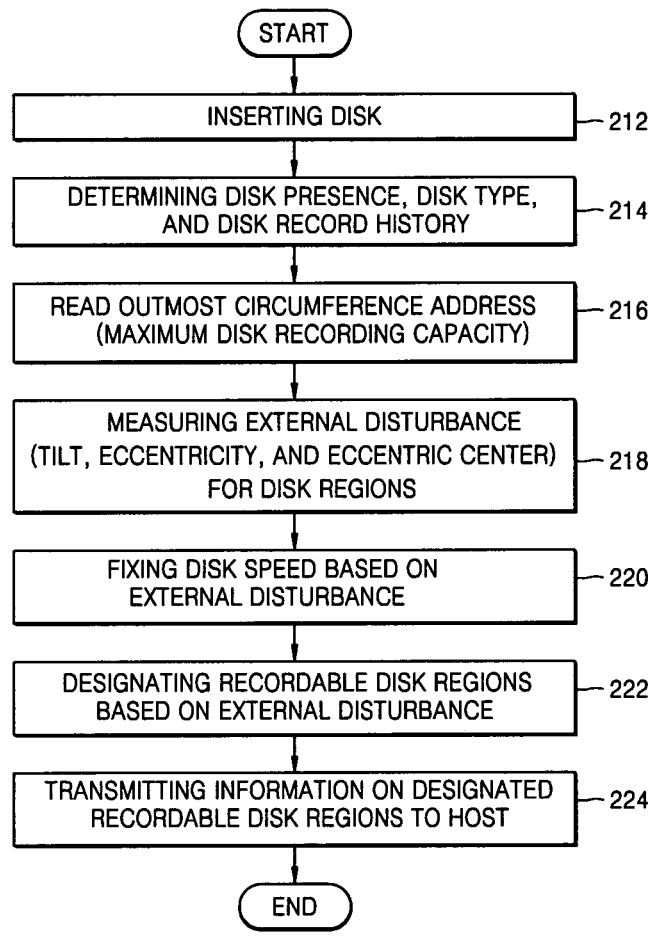
FIG. 2 is a flowchart showing a method of designating disk recording capacity according to the present invention.

FIG. 2 is a flowchart showing a method of designating disk recording capacity according to an embodiment of the present invention.

When an optical disk 10 is inserted in operation 212 into the recording/reproducing apparatus shown in FIG. 1, disk presence, disk type, and disk recording history are determined by using an RF signal and a read-in signal read from the optical disk 10 in operation 214. More specifically, the disk presence is determined based on the rotational velocity of the optical disk 10 or the RF signal. The disk type is determined by using the read-in signal. The disk type includes, for example, CD, DVD, 2.6 GB DVD-RAM, 4.7 GB DVD-RAM, and so on. Information on the disk type can be obtained by using the read-in signal from a read-in region of the optical disk. Alternatively, the information on the disk type can be obtained by measuring reflectance of the optical disk 10, which depends on the type of the optical disk.

After the disk presence, the disk type, and the disk recording history are determined, an address of an outmost circumference of the read-in region where data is to be recorded is read in operation 216.

Next, it is determined whether or not there is an external disturbance affecting the disk regions in operation 218. The external disturbance includes, for example, tilts, eccentricity, and eccentric centers of the disk. More specifically, the disk is partitioned into, for example, 10 disk regions from an inner circumference to an outer circumference, and then, whether the external disturbance exceeds a predetermined design-rule value as measured at each of the 10 disk regions is determined. For example, if the external disturbance measured at the fourth disk region exceeds the design rule, disk regions from the fourth disk region to the outmost disk region corresponding to the outmost circumference may be designated as non-recordable disk regions. In an embodiment where the tilt is selected as the external disturbance, a signal output from a tilt sensor (not shown) is used to calculate the tilt of the disk. In addition, light reflected on the disk detected by the optical pick-up unit 20 may be used to calculate the tilt of the disk.

If the tilt is more than a predetermined reference value, it is difficult to record data on the disk due to the distortion of the optical axis even in a case where the speed of the disk decreases.

Therefore, the speed of the disk is fixed so that the data can be stably recorded on the disk in accordance with the external disturbance in operation 220. Next, the disk regions that are actually recordable are designated again in operation 222. In other words, according to aspects of the present invention, non-recordable disk regions are detected in advance based on the external disturbance measured at the disk regions. Therefore, it is possible to designate the disk regions excluding the non-recordable disk regions, that is, the disk regions where the measured external disturbance exceeds the threshold, as recordable disk regions.

Next, information on the designated recordable disk regions, that is, an address of outmost circumference of the disk regions where data is actually recordable on the disk, is transmitted to the host 90 in operation 224. The host 90 calculates the maximum recording capacity based on the address of the outmost circumference and displays the maximum recording capacity in an on-screen-display manner. For example, if a tilt of 2° is measured at an outer circumference of a 4.7 GB DVD+R disk, an address of the outer circumference corresponding to the last usable recording region is transmitted to the host 90. Therefore, a maximum recording capacity of, for example, 3.0 GB rather than 4.7 GB is displayed on the window of the host 90. Data is recorded on only the designated recordable disk regions.

As a result, instead of maximum physical recording capacity, an actual recording capacity represented by useable disk regions can be designated as the maximum recording capacity.

According to aspects of the present invention, an external disturbance is measured and determined at disk regions and a user is informed of a maximum recording capacity, so that the user can be aware of the disk defect in advance and record data within the maximum recording capacity.

The present invention may be implemented as a method, apparatus, system, etc. When implemented in software, elements of the present invention are essentially code segments to perform necessary tasks. The code segments or a program can be stored in a processor readable medium or transmitted as computer data signals coupled to a carrier wave through a communication medium or network. The processor readable medium includes any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, an optical fiber medium, an RF network, etc. Examples of the computer data signals include any signals that can be transmitted through a transmission medium such as an electronic network channel, an optical fiber, air, an electromagnetic network, and an RF network.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk recording method, comprising:
   partitioning a disk into a plurality of disk regions, and measuring for an external disturbance at each of the disk regions, from an internal circumference to an outer circumference of the disk, and measuring the tilt and eccentric center for each of the disk regions;
   setting a disk speed based on the measured external disturbance, and designating disk regions, excluding the disk regions where the external disturbance is measured, as recordable disk regions; and
   calculating a maximum disk recording capacity based on the designated recordable disk regions.

2. The disk recording method according to claim 1, wherein the designating of the disk regions, comprises designating the disk regions as the recordable disk regions, excluding the disk regions where the measured external disturbance is more than a threshold.

3. The disk recording method according to claim 1, wherein the designating of the disk regions comprises designating non-recordable disk region addresses according to an amount of the measured external disturbance, and designating the recordable disk regions according to the non-recordable disk regions.

4. A disk recording method, comprising:
   partitioning a disk into a plurality of disk regions, and measuring for an external disturbance at each of the disk regions;
   setting a disk speed based on the measured external disturbance, and designating disk regions, excluding the disk regions where the external disturbance is measured, as recordable disk regions; and
   calculating a maximum disk recording capacity based on the designated recordable disk regions,
   wherein the calculating of the maximum disk recording capacity comprises calculating the maximum disk recording capacity based on a recordable disk region address corresponding to an outmost circumference of the disk.

5. The disk recording method according to claim 4, wherein the maximum disk recording capacity is displayed at a host.

* * * * *